US012763565B2

(12) United States Patent
Clark

(10) Patent No.: US 12,763,565 B2
(45) Date of Patent: Oct. 13, 2026

(54) CONNECTOR COVER ASSEMBLIES

(71) Applicant: Hubbell Incorporated, Shelton, CT (US)

(72) Inventor: Adam Joseph Clark, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 391 days.

(21) Appl. No.: 18/211,119

(22) Filed: Jun. 16, 2023

(65) Prior Publication Data

US 2023/0411873 A1 Dec. 21, 2023

Related U.S. Application Data

(60) Provisional application No. 63/405,254, filed on Sep. 9, 2022, provisional application No. 63/353,516, filed on Jun. 17, 2022.

(51) Int. Cl.
*H01R 4/20* (2006.01)
*H01R 4/2466* (2018.01)
(Continued)

(52) U.S. Cl.
CPC ............. *H02G 15/113* (2013.01); *H01R 4/20* (2013.01); *H01R 4/2466* (2013.01);
(Continued)

(58) Field of Classification Search
CPC .......... H01R 4/20; H01R 4/70; H01R 4/2466; H01R 4/2495; H01R 11/05; H01R 11/09;
(Continued)

(56) References Cited

U.S. PATENT DOCUMENTS

| | | | |
|---|---|---|---|
| 3,032,603 | A | 5/1962 | Whitley |
| 3,617,615 | A | 11/1971 | Balzer |

(Continued)

FOREIGN PATENT DOCUMENTS

| | | |
|---|---|---|
| CN | 112805880 | 5/2021 |
| CN | 113270782 | 8/2021 |

(Continued)

OTHER PUBLICATIONS

International Search Report and Written Opinion mailed Nov. 28, 2023 in corresponding application PCT/US2023/25600 (11 pages).

(Continued)

*Primary Examiner* — Harshad C Patel
(74) *Attorney, Agent, or Firm* — Wissing Miller LLP

(57) ABSTRACT

An enclosure for containing an electrical connector for connecting a plurality of conductors, the enclosure including a first cover half, a second cover half, at least one first seal member positionable between the first cover half and the second cover half, a first latch member pivotably attached to the first cover half and a second latch member pivotably attached to the second cover half. When the first cover half is mated with the second cover half with the at least one seal member positioned between the first cover half and the second cover half, the first latch member is pivoted to latch with the second cover half and the second latch member is pivoted to latch with the first cover half.

16 Claims, 13 Drawing Sheets

(51) Int. Cl.

| | |
|---|---|
| ***H01R 4/2495*** | (2018.01) |
| ***H01R 4/70*** | (2006.01) |
| ***H01R 11/05*** | (2006.01) |
| ***H01R 11/09*** | (2006.01) |
| ***H01R 43/01*** | (2006.01) |
| ***H01R 43/058*** | (2006.01) |
| ***H02G 15/013*** | (2006.01) |
| ***H02G 15/113*** | (2006.01) |

(52) U.S. Cl.
CPC ............. *H01R 4/2495* (2013.01); *H01R 4/70* (2013.01); *H01R 11/05* (2013.01); *H01R 11/09* (2013.01); *H01R 43/01* (2013.01); *H01R 43/058* (2013.01); *H02G 15/013* (2013.01)

(58) Field of Classification Search
CPC .... H01R 43/058; H01R 43/01; H02G 15/113; H02G 15/013
USPC .......................................................... 439/731
See application file for complete search history.

(56) References Cited

U.S. PATENT DOCUMENTS

| | | | | | |
|---|---|---|---|---|---|
| 3,835,444 | A | | 9/1974 | Plana | |
| 4,029,896 | A | * | 6/1977 | Skinner | F24C 15/104 219/541 |
| 4,095,043 | A | | 6/1978 | Martin et al. | |
| 4,344,665 | A | | 8/1982 | Racilla et al. | |
| 4,427,253 | A | * | 1/1984 | Smith | H01R 4/2408 439/413 |
| 4,581,480 | A | | 4/1986 | Charlebois | |
| 4,875,874 | A | | 10/1989 | Windsor | |
| 4,975,081 | A | | 12/1990 | Daly et al. | |
| 5,211,706 | A | * | 5/1993 | Polgar | H01R 13/5841 439/465 |
| 5,344,330 | A | | 9/1994 | Hoffman | |
| 5,591,046 | A | | 1/1997 | Klein et al. | |
| 5,606,150 | A | | 2/1997 | Radliff et al. | |
| 5,632,081 | A | | 5/1997 | Gerhard, Jr. | |
| 5,691,508 | A | | 11/1997 | Radliff et al. | |
| 5,839,911 | A | * | 11/1998 | Dinkel | H01R 13/582 439/470 |
| 5,908,327 | A | * | 6/1999 | Tsuji | H01R 24/84 439/470 |
| 5,967,830 | A | * | 10/1999 | Tsuji | H02G 3/0691 439/470 |
| 5,971,792 | A | | 10/1999 | Lin | |
| 6,019,638 | A | * | 2/2000 | Saka | H01R 13/7197 439/470 |
| 6,059,602 | A | * | 5/2000 | Ward | H01R 13/6581 439/465 |
| 6,111,201 | A | | 8/2000 | Drane et al. | |
| 6,168,457 | B1 | | 1/2001 | Kim | |
| 6,280,235 | B1 | | 8/2001 | Radliff | |
| 6,368,129 | B1 | * | 4/2002 | Wang | H01R 12/89 439/60 |
| 6,538,204 | B2 | | 3/2003 | Connor | |
| 7,141,738 | B2 | | 11/2006 | Marsac et al. | |
| 7,201,604 | B1 | * | 4/2007 | Amidon | H01R 13/5825 439/418 |
| 7,442,064 | B2 | * | 10/2008 | Miwa | H01R 43/26 439/341 |
| 7,477,826 | B2 | | 1/2009 | Mullaney et al. | |
| 7,507,108 | B2 | * | 3/2009 | Tsuji | H01R 13/5841 439/446 |
| 7,603,018 | B2 | | 10/2009 | Mullaney et al. | |
| 8,270,799 | B2 | | 9/2012 | Drouard | |
| 8,298,922 | B2 | * | 10/2012 | Schumann | H01R 13/502 438/467 |
| 8,714,994 | B2 | * | 5/2014 | Daily | H01R 24/64 439/344 |
| 8,772,641 | B2 | | 7/2014 | Badura et al. | |
| 8,979,568 | B2 | * | 3/2015 | Herbrechtsmeier | H01R 13/62966 439/346 |
| 9,111,428 | B2 | | 8/2015 | Fawcett et al. | |
| 9,509,067 | B2 | * | 11/2016 | Yamauchi | H01R 9/0518 |
| 9,707,927 | B1 | | 7/2017 | Boughner et al. | |
| 9,742,171 | B2 | | 8/2017 | Nooner et al. | |
| 9,793,636 | B2 | * | 10/2017 | France | H01R 9/2491 |
| 10,547,124 | B2 | | 1/2020 | Robicheau et al. | |
| 10,840,615 | B2 | * | 11/2020 | Newman | H01R 13/5216 |
| 11,146,028 | B2 | * | 10/2021 | Egami | H01R 13/74 |
| 11,329,423 | B2 | * | 5/2022 | Chamura | H01R 13/5829 |
| 11,431,114 | B2 | | 8/2022 | Newman | |
| 2006/0030210 | A1 | | 2/2006 | Willing et al. | |
| 2010/0107407 | A1 | | 5/2010 | Freakes | |
| 2016/0268723 | A1 | * | 9/2016 | Berengut | H01R 13/713 |
| 2018/0261944 | A1 | * | 9/2018 | Papageorge | H01R 13/5825 |
| 2019/0058265 | A1 | * | 2/2019 | Robicheau | H01R 4/186 |
| 2019/0301710 | A1 | | 10/2019 | Harris et al. | |
| 2019/0377140 | A1 | * | 12/2019 | Mathews | H01R 13/633 |
| 2020/0059013 | A1 | | 2/2020 | Oishi | |
| 2020/0235498 | A1 | | 7/2020 | Robicheau et al. | |
| 2023/0198192 | A1 | * | 6/2023 | Li | H01R 13/514 439/625 |
| 2023/0411946 | A1 | * | 12/2023 | Clark | H01R 11/05 |

FOREIGN PATENT DOCUMENTS

| | | |
|---|---|---|
| DE | 102015207953 B4 | 2/2017 |
| WO | 216106065 | 6/2016 |

OTHER PUBLICATIONS

International Search Report and Written Opinion mailed Nov. 28, 2023 in corresponding application PCT/US2023/25607 (11 pages).

International Search Report and Written Opinion mailed Dec. 14, 2023 in corresponding application PCT/US2023/25601 (22 pages).

International Preliminary Report on Patentability in related International Application No. PCT/US2023/025600 mailed Dec. 26, 2024. (8 pages).

International Preliminary Report on Patentability in related International Application No. PCT/US2023/25607 mailed Dec. 26, 2024. (8 pages).

International Preliminary Report on Patentability in corresponding International Application No. PCT/US2023/25601 mailed Dec. 26, 2024. (7 pages).

* cited by examiner

Fig. 15
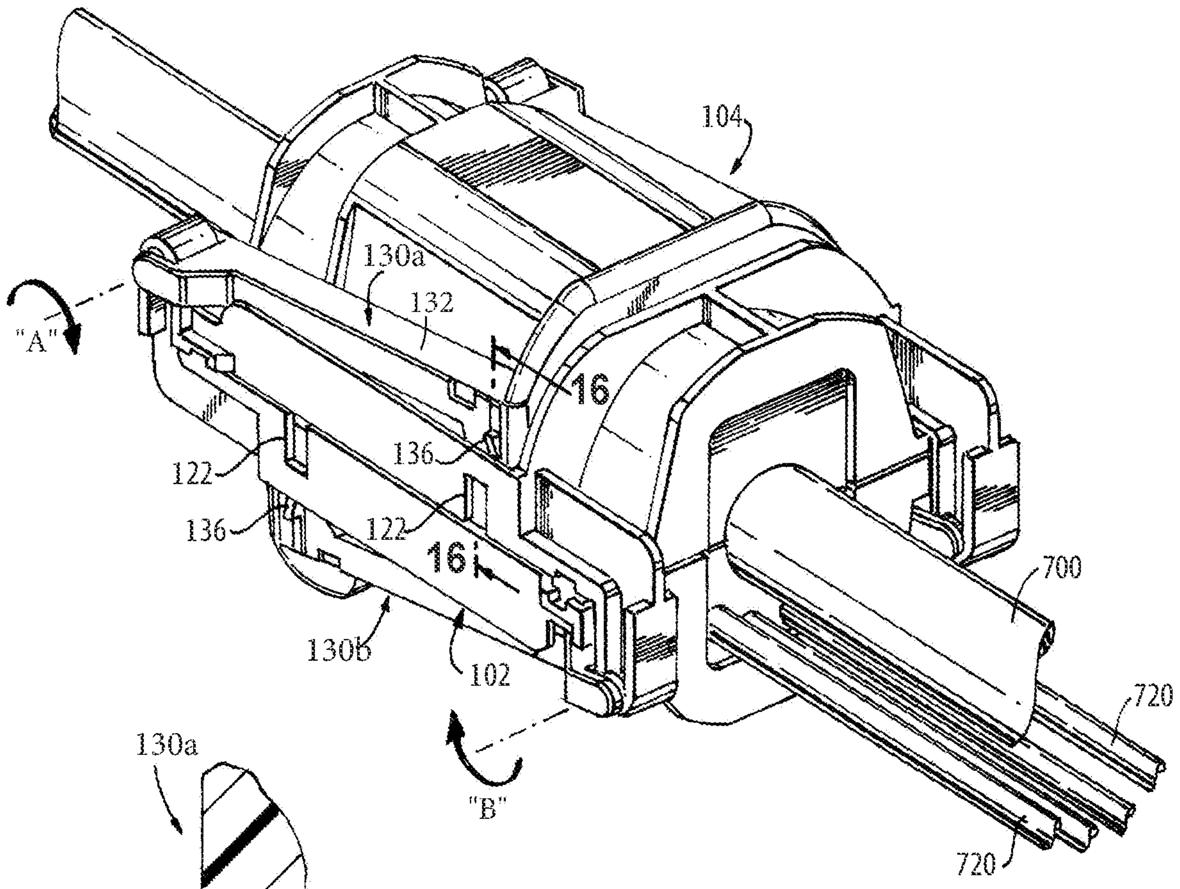
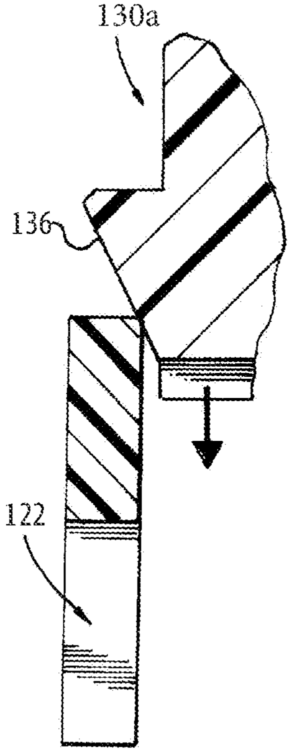
Fig. 16

Fig. 17
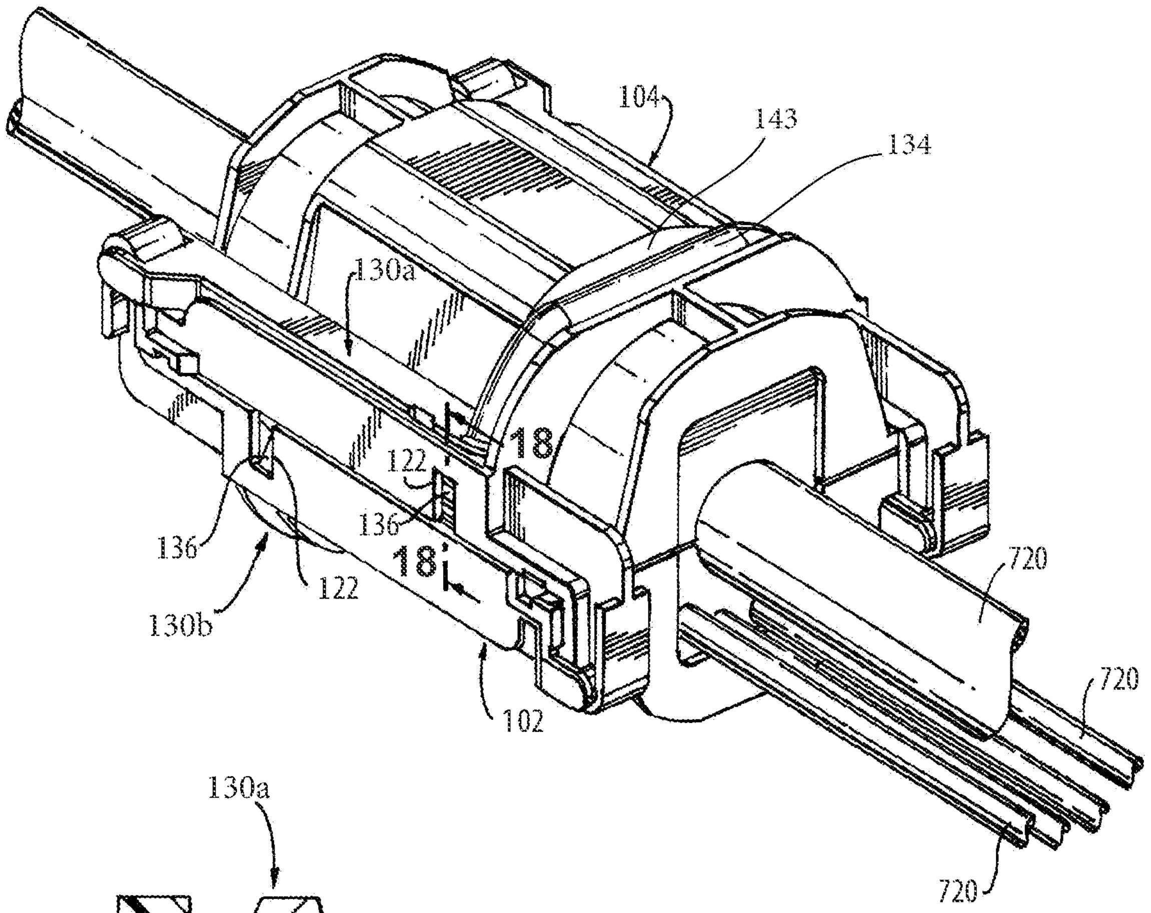
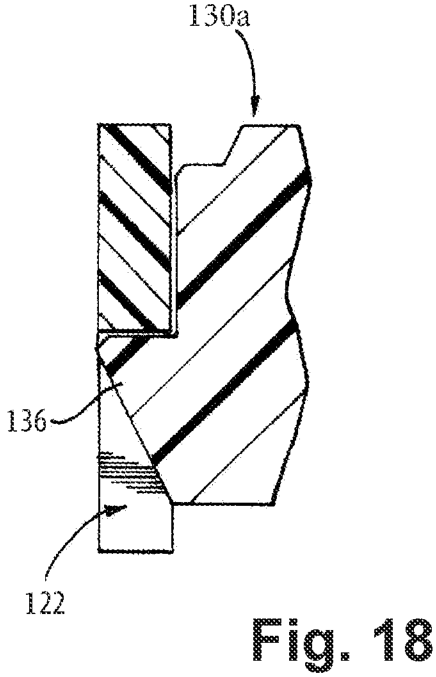
Fig. 18

CONNECTOR COVER ASSEMBLIES

REFERENCE TO RELATED APPLICATIONS

This application is based on and claims priority to U.S. Provisional Application Ser. No. 63/353,516 filed Jun. 17, 2022 entitled COMPRESSION CONNECTORS and U.S. Provisional Application Ser. No. 63/405,254 filed Sep. 9, 2022 entitled COMPRESSION CONNECTORS AND PROTECTIVE COVERS the contents of each of which are incorporated herein in their entirety by reference.

BACKGROUND

Field

The present disclosure relates generally to cover assemblies and more specifically, to connector cover assemblies.

Description of the Related Art

Tap connectors have been used to establish an electrical connection between a continuous main power conductor to a branch conductor. Compression type tap connectors are typically adapted to receive a branch or tap conductor, to engage a continuous run conductor, and to be compressed by a crimping tool to achieve the desired connection.

If the run conductor and the branch conductors crimped to the connector remain outside in the environment, damage to the connection can occur over time. In addition, having uninsulated or uncovered connectors and conductors exposes individuals to potential hazards including, for example, fires, burns, electric shock, etc. Accordingly, it would be desirable to place the crimped connection in a protective housing.

SUMMARY

An enclosure for containing an electrical connector for connecting a plurality of conductors, the enclosure including a first cover half, a second cover half, at least one first seal member positionable between the first cover half and the second cover half, a first latch member pivotably attached to the first cover half and a second latch member pivotably attached to the second cover half. When the first cover half is mated with the second cover half with the at least one seal member positioned between the first cover half and the second cover half, the first latch member is pivoted to latch with the second cover half and the second latch member is pivoted to latch with the first cover half.

An enclosure for containing an electrical connector for connecting a plurality of conductors, the enclosure including a first cover half, a second cover half, at least one first seal member positionable with respect to at least one of the first cover half and the second cover half, at least one second seal member positionable with respect to at least one of the first cover half and the second cover half, a first latch member pivotably attached to the first cover half and a second latch member pivotably attached to the second cover half. When the first cover half is mated with the second cover half with the at least one seal member and the at least one second seal member positioned with respect to the first cover half and the second cover half, the first latch member is pivoted to latch with the second cover half and the second latch member is pivoted to latch with the first cover half.

An enclosure for containing electrical connectors for connecting a plurality of conductors, the enclosure including a first cover half including a first cavity and at least one wall including one or more alignment notches, a second cover half including a second cavity and at least one wall including one or more alignment notches, at least one seal member positionable between the first cover half and the second cover half, a first latch member pivotably attached to the first cover half and a second latch member pivotably attached to the second cover half. When the first cover half is mated with the second cover half the first and second cavities form an inner pocket for receiving an electrical connector.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 15 depicts the cover assembly for describing another step in the process for installing conductors crimped to the compression connector depicted in FIG. 12 into the cover assembly of FIG. 1 according to an illustrative embodiment of the present disclosure;

FIG. 16 is an enlarged cross-sectional view of a portion of FIG. 15 taken along line 16-16 showing a snap arm of a latch member making contact with a cover half according to an illustrative embodiment of the present disclosure;

FIG. 17 is another perspective view of the cover assembly of FIG. 15, illustrating the first cover half mated to the second cover half and the first and second latch members in a latching position interlocking the first cover half to the second cover half according to an illustrative embodiment of the present disclosure; and FIG. 18 is an enlarged cross-sectional view of a portion of FIG. 17 taken along the line 18-18 showing the snap arm of the latch member in the locked position according to an illustrative embodiment of the present disclosure.

DETAILED DESCRIPTION

Connectors including, for example, compression connectors can be used to electrically connect conductors. For example, compression connectors are often used to electrically connect one or more branch or tap conductors to one or more run or main conductors. For ease of description, the compression connector may be referred to as the “connector” in the singular and the “connectors” in the plural. The branch or tap conductors may be referred to as the “branch conductor” in the singular and the “branch conductors” in the plural. The main or run conductors may be referred to as the “run conductor” in the singular and the “run conductors” in the plural. It is noted that the run conductors are typically greater in size than the branch conductors. Further, the run conductors and the branch conductors can be solid conductors or they can be stranded conductors. Typically, the run conductors and branch conductors are stranded conductors. The ports, slots, channels, apertures or other openings in the compression connectors that receive the branch conductors may also be referred to as the “branch opening” in the singular and the “branch openings” in the plural. The ports, slots, channels, apertures or other openings in the compression connectors that receive the run conductors may also be referred to as the “run opening” in the singular and the “run openings” in the plural. One or more terms including joining, connecting or mating may be used together or individually to describe the union of cover halves as illustrated and described in the present disclosure. These terms unless otherwise indicated are intended to convey the same or similar meaning.

Dies sets used to compress the connectors may be, for example, configured to be mounted to a tool and to receive the connectors so that run conductors and branch conductors can be crimped to the connectors.

The present disclosure relates to enclosures and, more particularly, to enclosures for containing connectors and protecting the connectors and the electrical connections they make from the environment. While the present disclosure refers to compression connectors, it will be appreciated aspects of the enclosures described herein may be used for enclosing any suitable type of connector used to connect conductors.

While the present disclosure references branch and run as well as branch and run conductors for ease of reference, it will be appreciated the various embodiments of the connectors and enclosures described herein would be suitable for mechanically and electrically joining any one conductor to any one or more other conductors regardless of the nomenclature assigned thereto and for enclosing the same.

Figure 12:
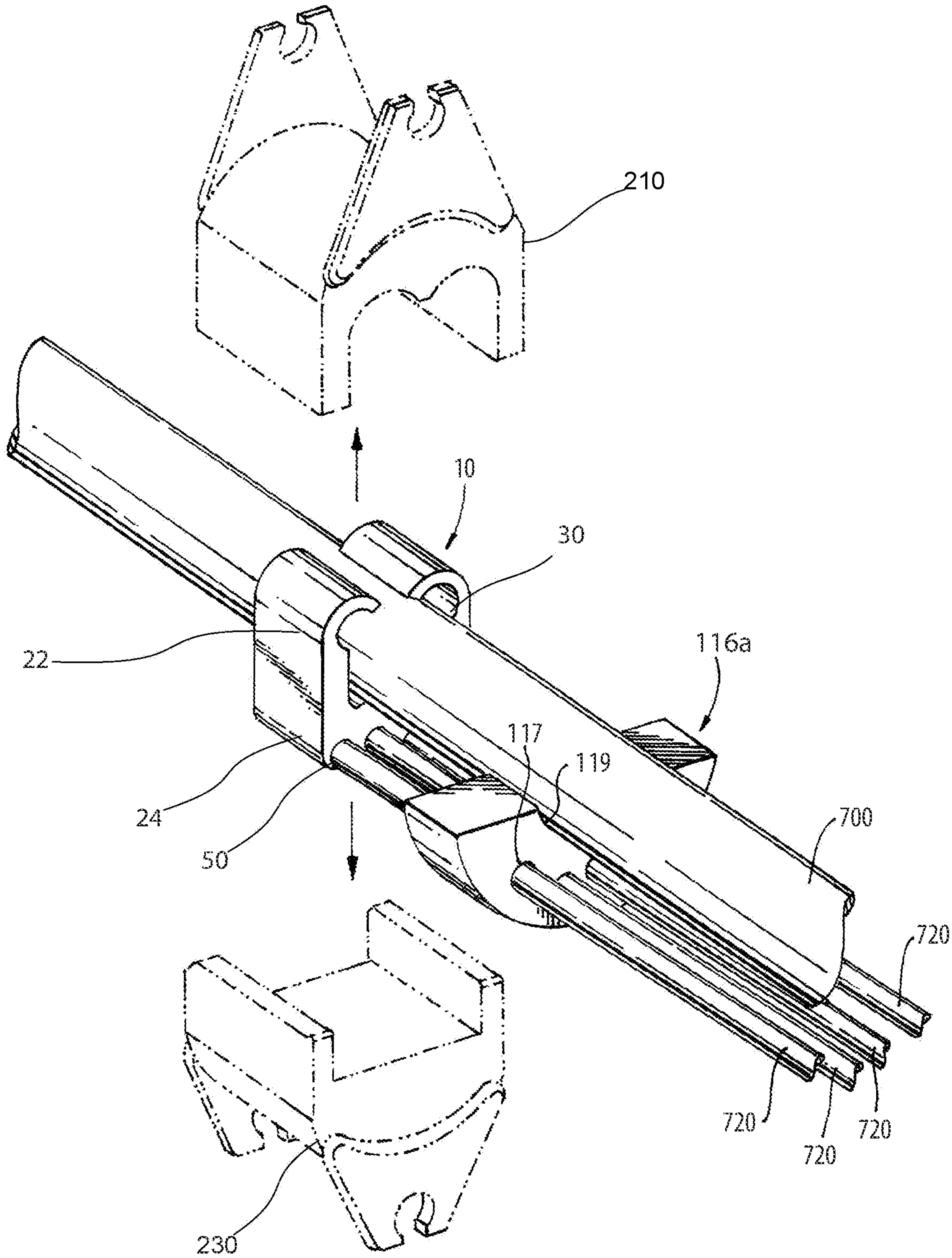

A non-limiting example of a compression connector is shown in FIG. 12 and is referred to herein as connector 10. Connector 10 includes a body having a run conductor portion 22 and a branch conductor portion 24. The run conductor portion 22 generally includes two side walls and a bottom wall that form or define a portion of the run conductor opening 30. A portion of the side walls are configured and dimensioned so that side walls can be shaped during a crimping process so that the tips of the side walls may pierce through an insulating jacket of the run conductor 700 and contact the electrical wire of the run conductor. According to this non-limiting example, the run conductor portion 22 may be a substantially U-shaped like structure with a first portion of the side walls and the bottom wall configured, dimensioned and shaped so that the run opening 30 can receive a run conductor. As a non-limiting example, the size of the run conductor 700 can range from about 250 Kcmil to about 750 Kcmil. With a 250 Kcmil run conductor, the side walls and the bottom wall are configured, dimensioned and shaped to form a run conductor opening 30 sufficient to receive the 250 Kcmil run conductor. With a 750 Kcmil run conductor 700, the side walls and the bottom wall are configured, dimensioned and shaped to form a run opening sufficient to receive the 750 Kcmil run conductor. The bottom wall of the connector 10 may include one or more insulation piercing members that extend into the run opening. Each insulation piercing member may include an insulation piercing tip that is configured and dimensioned to pierce or cut through the insulating jacket of the run conductor to create an electrical path between the run conductor and the connector 10. The one or more insulation piercing members may be integrally or monolithically formed into the bottom wall of connector 10 such that the one or more insulation piercing members extend into the run opening 30. In addition or alternatively one or more of the insulation piercing members may be secured to or attached to the bottom wall of connector 10 so that the one or more insulation piercing members extend into the run opening.

The insulation piercing members may be generally triangular in shape. However, the insulation piercing members may come in different shapes and sizes configured and dimensioned to pierce or cut through the insulating jacket surrounding electrical wires of the run conductor, such as a cone-shaped member or a member with a pointed tip. Further, the insulation piercing members may include a serrated tip to improve conductivity and retention of the insulating piercing members in the conductor strands.

The branch connector portion 24 of connector 10 includes one or more branch conductor openings 50. Each branch conductor opening 50 can be configured and dimensioned to receive one or more branch conductors 720. In the embodiment shown, the branch conductor portion 24 includes four branch conductor openings 50. Each branch conductor opening 50 extends along the width of the body of connector 10.

After a crimping process, connector 10 substantially resembles that depicted in FIG. 12. In particular, the side walls of the run conductor portion 22 of connector 10 are shaped during a crimping process so that the tips of the side walls may pierce through an insulating jacket of the run conductor 700 and contact the electrical wire of the run conductor providing a secure mechanical and electrical connection between the run conductor 700 and the connector 10. In addition, during this process, the branch connector portion 24 is crimped or compressed securing the one or more branch conductors 720 and providing a secure mechanical and electrical connection between the one or more branch conductors 720 and the connector 10.

To ensure longevity of the connection of the run conductor 700 and the one or more branch conductors 720 to the connector 10, it is desirable to protect the crimped connection from the environment. According to an embodiment of the present disclosure, the crimped connector may be placed in a suitable housing or enclosure to protect the connector and the connected portions from the elements. The cover assembly also protects individuals from hazards associated with having exposed electrical connections.

Figure 1:
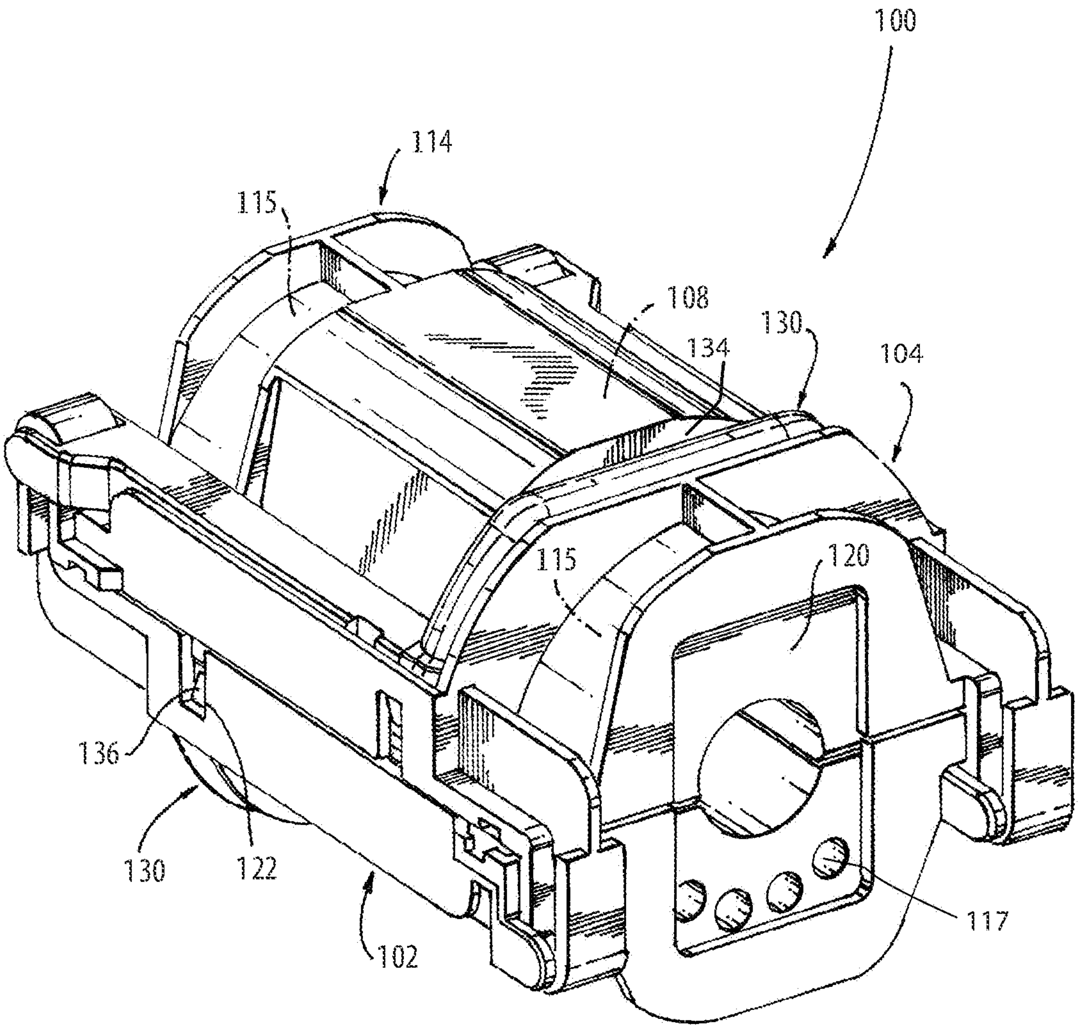
FIG. 1 is a perspective view of an exemplary embodiment of a cover assembly according to the present disclosure, illustrating a first cover half mated to a second cover half.

An enclosure or cover assembly according to an illustrative embodiment of the present disclosure is shown in FIG. 1 and is referred to generally as cover assembly 100. Cover assembly 100 is configured to snap or fit over the connector, e.g., connector 10, to limit and possibly prevent water penetration thus protecting the connection from the environment. Preferably, the cover is configured as a single piece of injection molded plastic that is self-mating. That is, the cover assembly may include two identical cover pieces that connect or mate to one another to form the complete cover assembly when one of the pieces is rotated about 180 degrees.

Figures 10, 11:
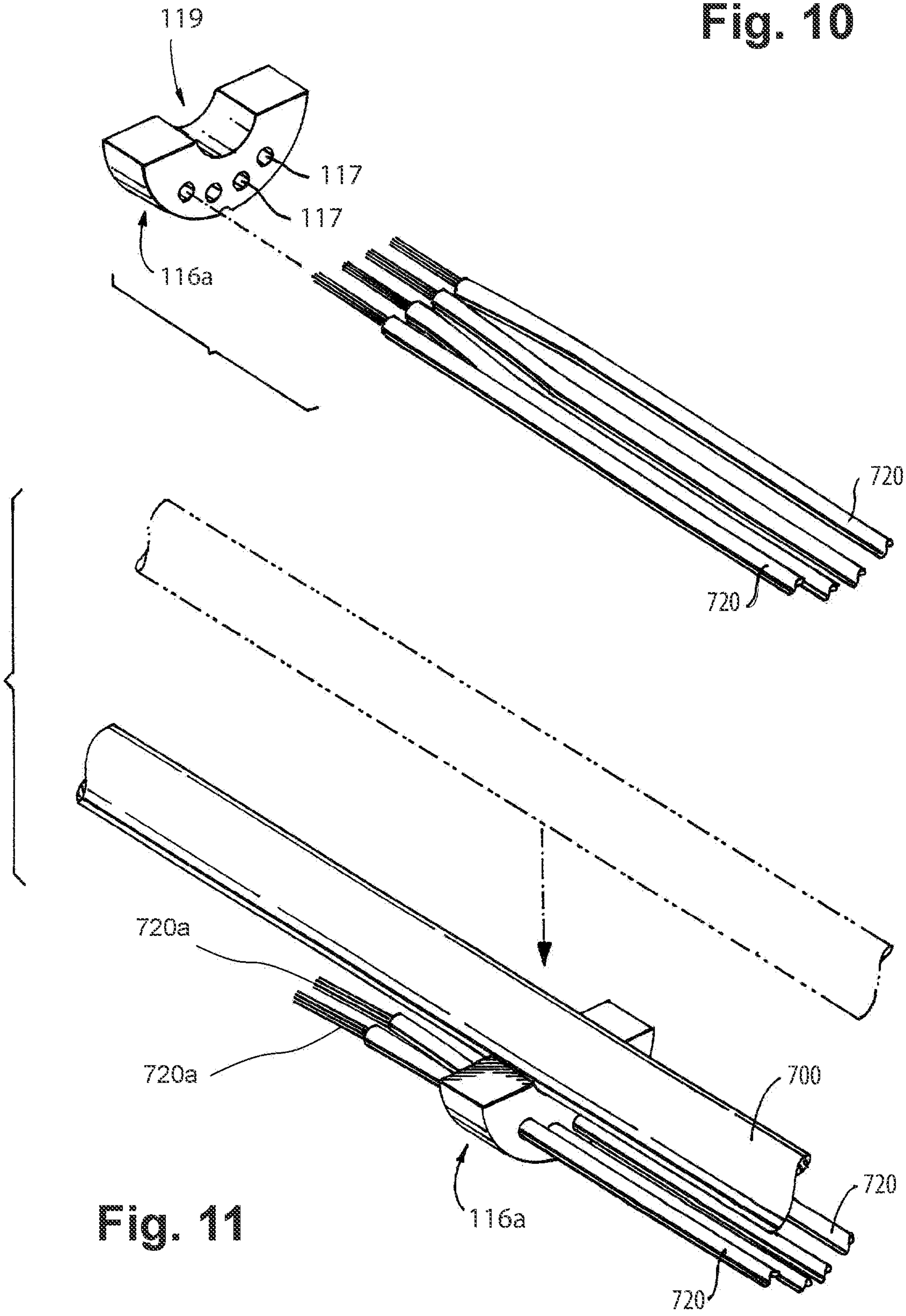
FIGS. 10, 11 and 12 depict steps in a process for installing conductors and a compression connector depicted in FIG. 12 into the cover assembly of FIG. 1 according to an illustrative embodiment of the present disclosure.

Referring to FIGS. 1-8, the cover assembly 100 has a first cover half 102 and a second cover half 104 configured and dimensioned to connect and lock to each other. Preferably, the first cover half 102 and second cover half 104 are identical to simplify the manufacture of the cover assembly 100. For the purposes of the present disclosure and ease of description, the first cover half 102 and second cover half 104 are considered identical such that the description of the first cover half 102 is the same for the second cover half 104. In the embodiment shown, the first cover half 102 has a cavity 106 (e.g., see FIG. 3) that is preferably generally centrally located in the first cover half 102. The cavity 106 is configured and dimensioned to receive a connector and one or more run conductors 700 and one or more branch conductors 720 that are crimped to the connector 10 (e.g., see FIGS. 11-13). When the first cover half 102 is joined, connected or mated with the second cover half 104, the two cavities 106 are joined to form an inner pocket 108 (FIG. 1) between the two cover halves 102 and 104. The cavity 106 of the first cover half 102 may also include one or more walls 110 including notches 111 and one or more walls 107 including notches 109. The walls and notches are used to align the first cover half 102 and second cover half 104 when joining, connecting or mating the first and second cover halves 102 and 104. For example, the notches 111 of walls 110 of first cover half 102 will engage the notches 109 of wall 107 of second cover half 104 when joining, connecting or mating the first and second cover halves 102 and 104. The first cover half 102 may also include one or more seal member cavities 114 at each end of the first cover half 102. When the first cover half 102 is joined, connected or mated with the second cover half 104, the one or more seal member cavities 114 are joined to form individual seal member pockets 115 at each end of the cover assembly 100. Each seal member cavity 114 is configured and dimensioned to receive at least a portion of a seal member 116 or 126 such that the seal member pocket 115 positions and retains one or more seal members. The first cover half 102 and the second cover half 104 include handle recesses 143 which receive handles 134 of latches 130 when in the locked position as will be described later below.

Figure 2:
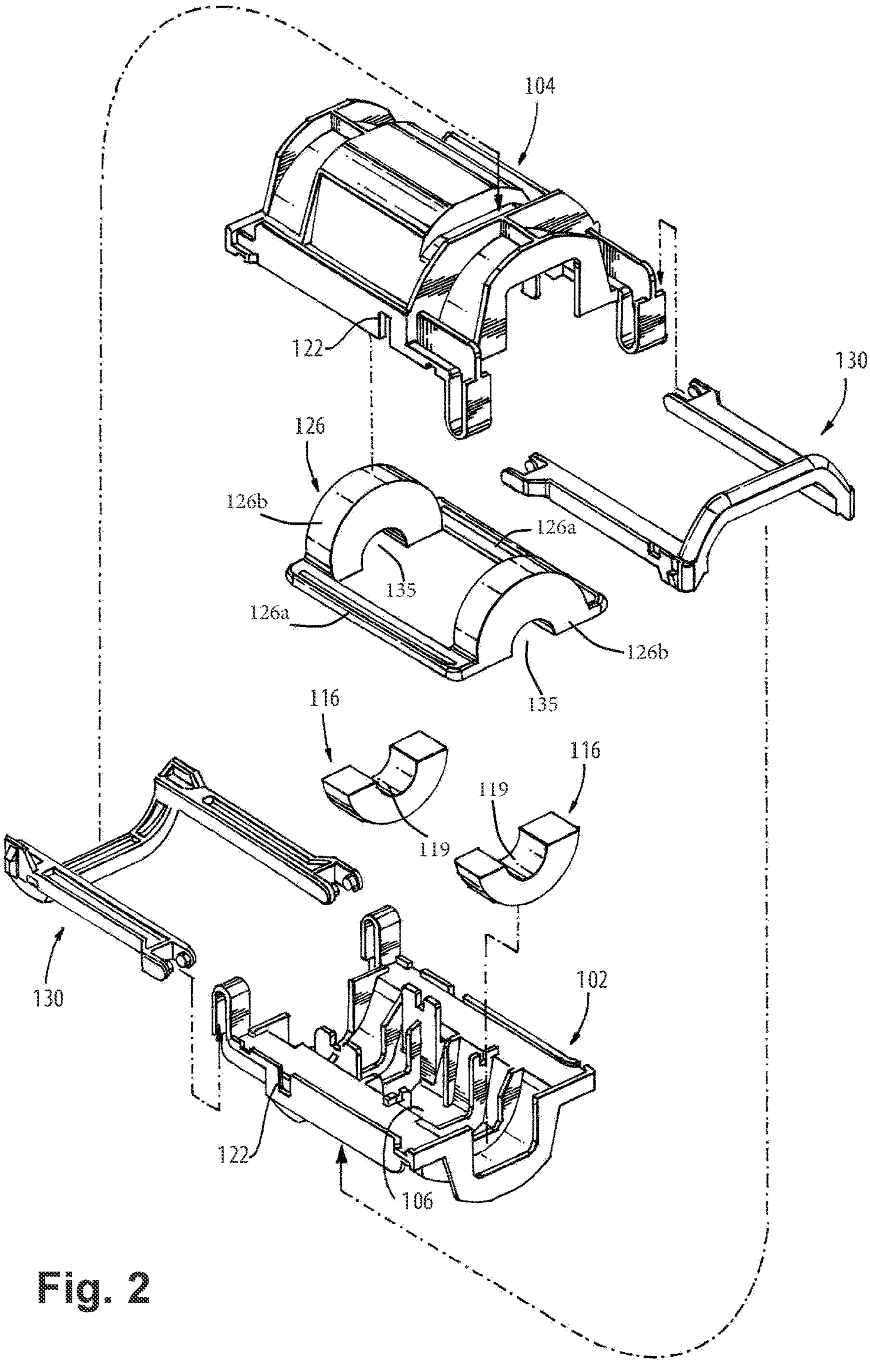
FIG. 2 is an exploded perspective view of the cover assembly of FIG. 1 illustrating the first cover half and the second cover half and latch members and multiple seal members positioned with respect to the first cover half and the second cover half according to an illustrative embodiment of the present disclosure.
Figure 3:
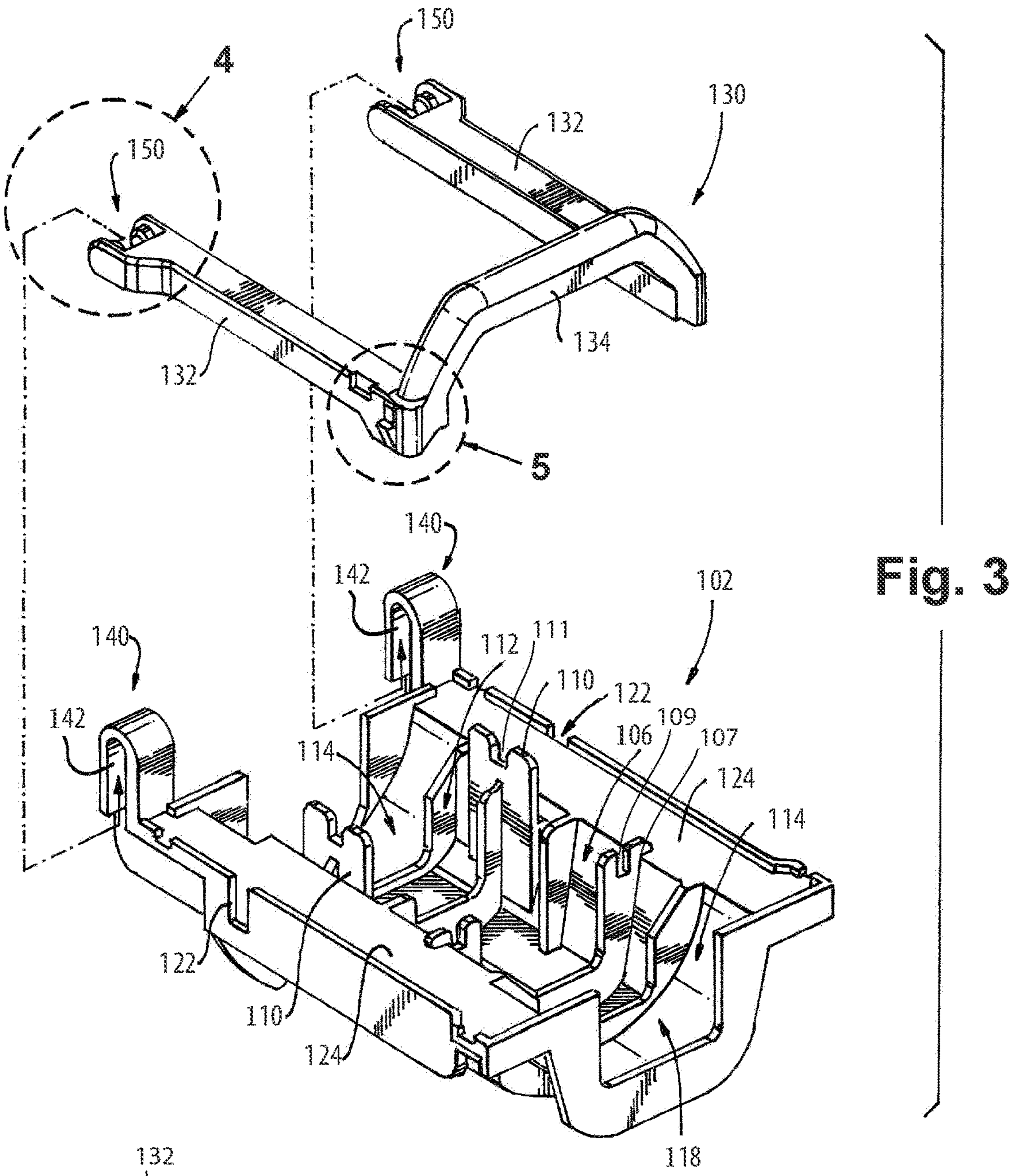
FIG. 3 is an exploded perspective view of the first cover half and the latch member of FIG. 2, illustrating the latch member positioned for mating to the first cover half according to an illustrative embodiment of the present disclosure.
Figure 4:
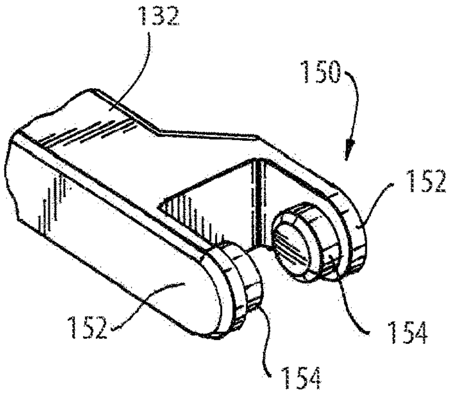
FIG. 4 is an enlarged view of a portion of FIG. 3 showing a pivot connection between the latch member and the first cover half according to an illustrative embodiment of the present disclosure.

Referring to FIGS. 2 and 3, seal members 116 are generally semicircular in cross-section having a defined thickness dimensioned to fit snugly within seal member cavities 114 of first and second cover halves 102, 104. Each seal member 116 includes a semicircular concave portion or notch 119 dimensioned to receive a run conductor (e.g., run conductor 700). For example, the dimensions or circumference of the semicircular concave portion or notch 119 may be selected to correspond to the circumference of a particularly sized run conductor. Alternatively, seal member 116 may be formed of a compressible and/or expandable material to accommodate run conductors of different dimensions or circumferences. Seal member 126 includes end portions **126*b* which are generally semicircular in cross-section having a defined thickness dimensioned to fit snugly within seal member cavities 114 of first and second cover halves 102, 104. Each end portion 126*b* of seal member 126 includes a semicircular concave portion or notch 135 dimensioned to receive a run conductor (e.g., run conductor 700). For example, the dimensions or circumference of the semicircular concave portion or notch 135 of seal member 126 may be selected to correspond to the circumference of a particularly sized run conductor. Alternatively, seal member 126 may be formed of a compressible and/or expandable material to accommodate run conductors of different dimensions or circumferences. Seal member 126 includes side portions 126*a* which extend between and join end portions 126*b*. Seal member 116 and/or seal member 126 may include one or more branch conductor apertures 117 dimensioned to receive branch conductors 720. A non-limiting example of materials suitable for seal members 116 and 126** is silicone-based and/or rubber insulating material.

Referring to FIGS. 1-3, to permit run and branch conductors, e.g., run conductor 700 and branch conductors 720, to pass into the cover assembly 100, the first cover half 102 and the second cover half 104 include a conductor channel portion 118 such that when the first cover half 102 is joined, connected or mated with the second cover half 104, the two conductor channel portions 118 are joined to form a conductor opening 120 through the cover assembly 100. The outside perimeter of the first cover half 102 and the second cover half 104 of the cover assembly 100 may also include one or more ledges, channels or other features 124. These features allow the outside perimeter of each cover half 102 and 104 to engage a side portion **126*a* of seal member 126. Thus, when the cover halves 102, 104 are joined together with the seal members 116 and 126 therebetween, an inner pocket or cavity 108 is formed. The contents of the inner pocket or cavity 108 can thus be protected from the environment and, in particular, can prevent or limit water from entering the inner pocket or cavity 108**.

Figure 5:
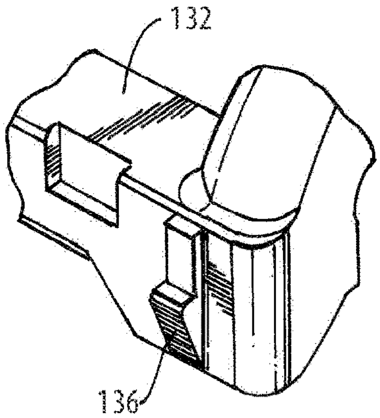
FIG. 5 is an enlarged view of a portion of FIG. 3 showing a snap lock provided in the latch member according to an illustrative embodiment of the present disclosure.

Referring to FIGS. 2-5, to releasably secure the first cover half 102 to the second cover half 104, a latch member 130 is coupled to the first cover half 102 and a latch member 130 is coupled to the second cover half 104. The latch member 130 includes a pair of legs 132 joined by a handle 134. As shown in FIGS. 3 and 5, each leg 132 may also include one or more snap arms 136 configured to interact with a corresponding snap recess 122 in the first cover half 102 and the second cover half 104. The snap arms provide a snap-locking feature that locks the first cover half 102 to the second cover half 104 to hold and retain the connector 10, the run conductor 700 and the branch conductors 720 in the cover assembly 100. To movably and pivotably couple a latch member 130 to the first cover half 102 and a latch member 130 to the second cover half 104, each cover half includes a pair of guide rails 140 and each latch member 130 includes a corresponding pair of carriage-like assemblies 150. The guide rails 140 are configured to interact with the carriage-like assemblies 150 to movably and pivotably couple the latch member 130 to the first cover half 102 or the second cover half 104. In the embodiment shown, each guide rail 140 includes a pair of channels 142 as shown in FIG. 3. As shown in detail in FIG. 4, each carriage-like assembly 150 includes a pair of side walls 152 extending from one end of each leg 132 of the latch member 130. Each side wall 152 includes a pin 154 extending towards each other. The pins 154 are configured to ride within the channels 142 in a guide rail 140 such that the latch member 130 is slidably coupled to or otherwise interconnected to the first cover half 102 or the second cover half 104 and pivotable or rotatable relative to the guide rail 140 and thus the first cover half 102 or the second cover half 104. It is noted that each latch member 130 is configured to generate leverage for purposes including, for example, for compressing the seal members 116 and 126 and sealing the cover assembly and protecting the contents from the environment. In addition to providing protection from the environment, the compressive force exerted by the latch members 130 to the seal members 116, 126 acts on the run conductor 700 and branch conductors 720 effectively providing strain relief to the run conductor 700 and the branch conductors 720. As depicted in detail in FIG. 5, each leg 132 includes a snap arm 136 designed, positioned and dimensioned to engage a snap recess 122 which are provided in the first and second cover halves 102 and 104. For example, when the first and second cover halves 102, 104 are to be connected, the snap arm 136 of leg 132 of the latch member 130 attached to first cover half 102 will engage the snap recess 122 in the second cover half 104. In addition, the snap arm 136 of the leg 132 of the latch member 130 attached to second cover half 104 will engage the snap recess 122 in the first cover half 102. The use of the snap arms 136 will be described in greater detail below.

Figure 6:
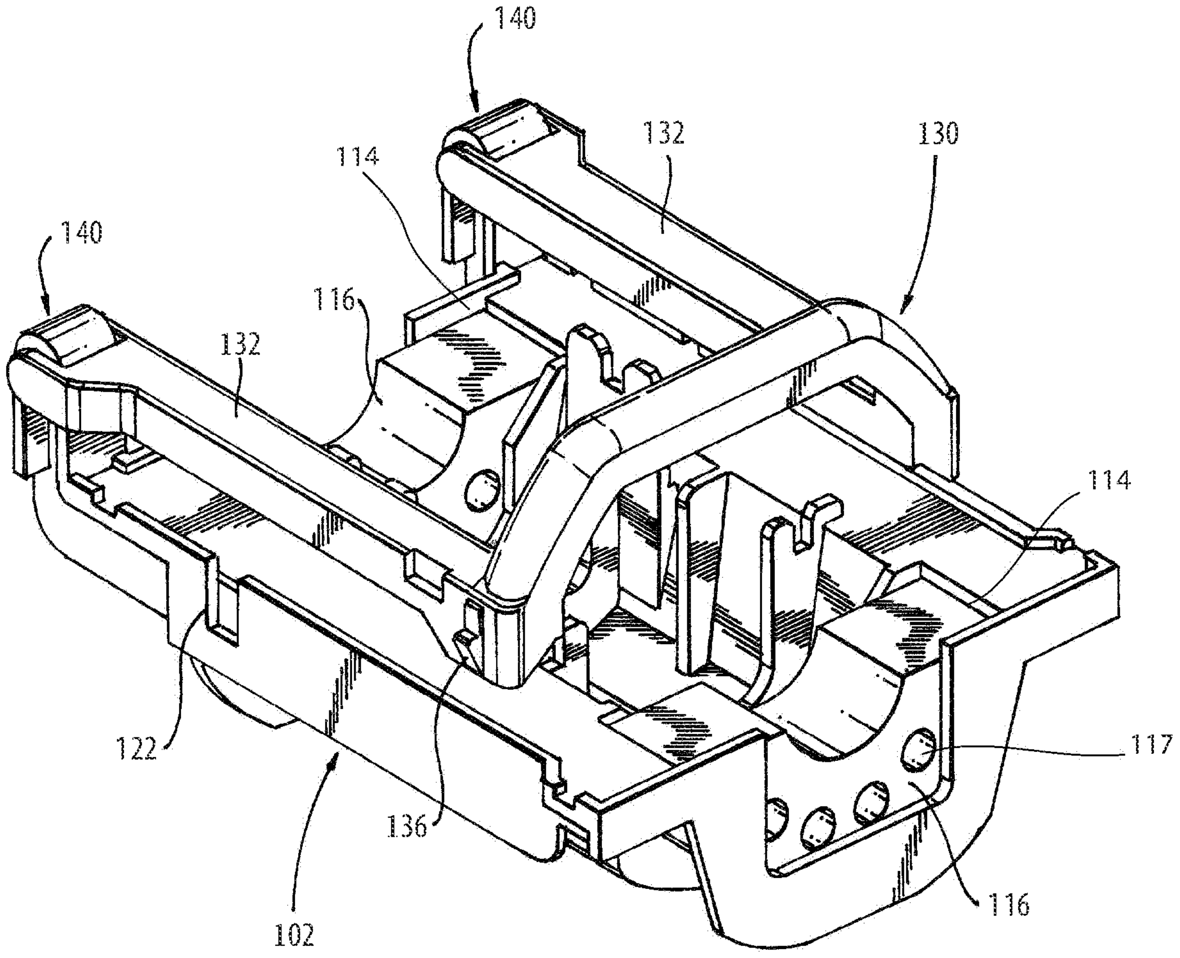
FIG. 6 is a perspective view of the inside of the first cover half with multiple first seal members positioned in the first cover half and the first latch member pivotably mated to the first cover half according to an illustrative embodiment of the present disclosure.

FIG. 6 depicts first cover half 102 including the latch member 130 and seal members 116 mounted thereto. Latch member 130 is joined to first cover half 102 by positioning the carriage-like assemblies 150 of latch member 130 adjacent or in this instance as depicted in FIG. 6, below channels 142 of guide rails 140 of first cover half 102 and sliding the pins 154 up into channels 142. Seal members 116 are inserted into seal member cavities 114 provided in each end of first cover half 102.

Figure 7:
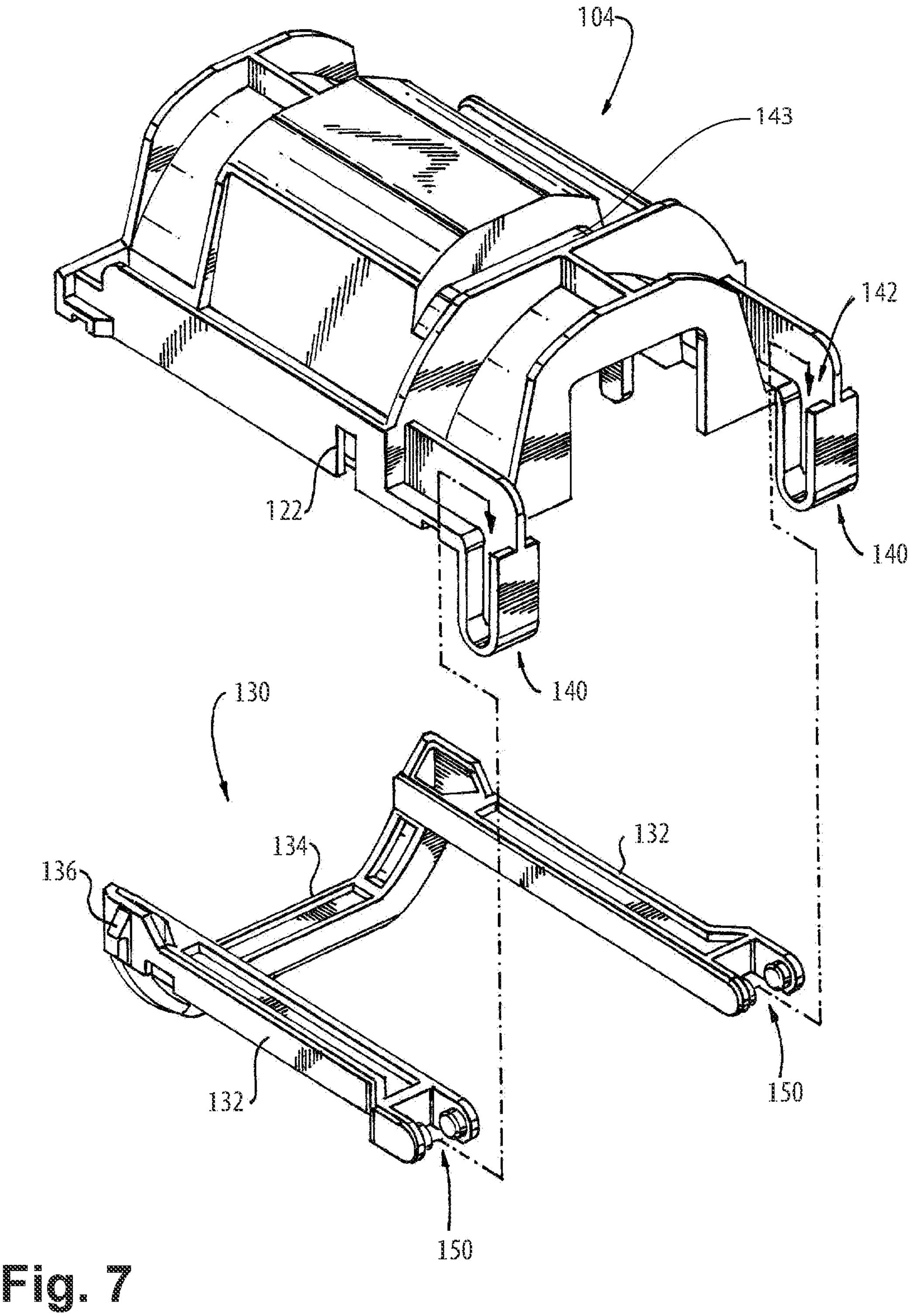
FIG. 7 is a perspective view of the second cover half and a second latch member of FIG. 2, illustrating the second latch member positioned for mating to the second cover half according to an illustrative embodiment of the present disclosure.
Figure 8:
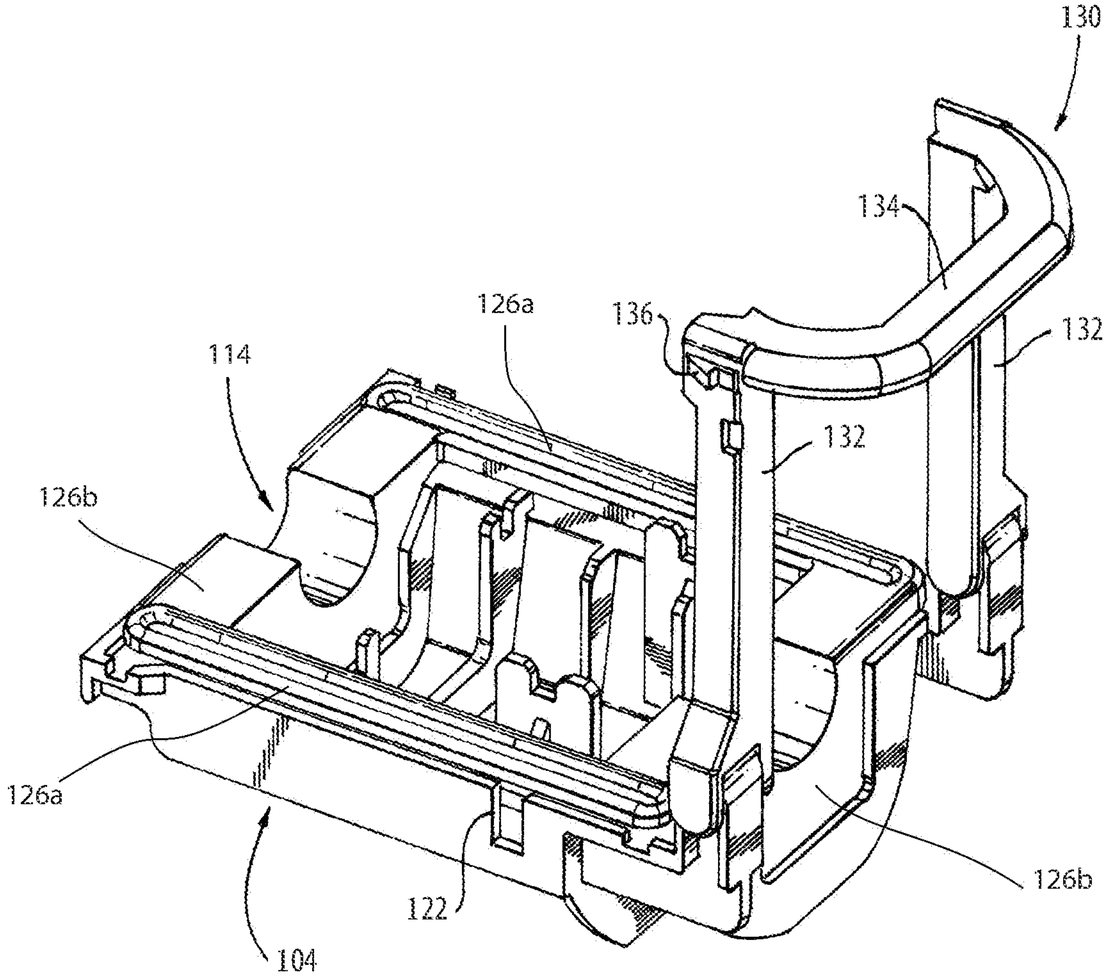
FIG. 8 is a perspective view of the inside of the second cover half and the second latch member of FIG. 7 separated from the second cover half, illustrating a seal member positioned inside the second cover half according to an illustrative embodiment of the present disclosure.

FIGS. 7 and 8 depict second cover half 104 including the latch member 130 and seal member 126 mounted thereto. Latch member 130 is joined to second cover half 104 by positioning the carriage-like assemblies 150 of latch member 130 adjacent or in this instance as depicted in FIG. 7 above channels 142 of guide rails 140 of the second cover half 104 and sliding the pins 154 down into channels 142. As depicted in FIG. 8, the ends 126*b* of seal member 126 are inserted into seal member cavities 114 provided in each end of second cover half 104. The side portions 126*a* of seal member 126 are positioned along the side portions of second cover half 104 as shown.

Figure 9:
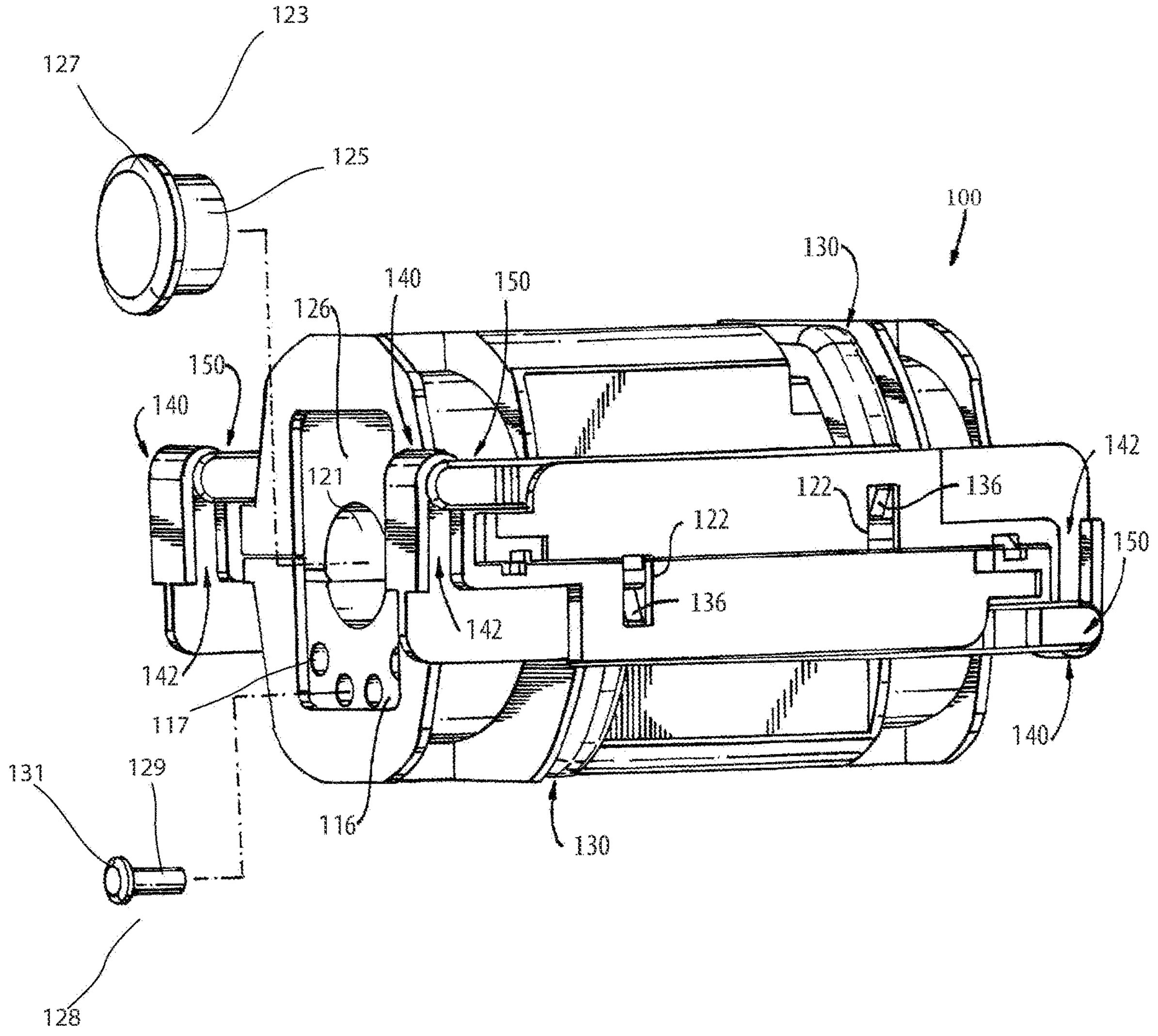
FIG. 9 is another perspective view of the cover assembly of FIG. 1, illustrating a first cover half mated to a second cover half and the first and second latch members in a latching position interlocking the first cover half to the second cover half and showing plugs allowing unused entry ports to the cover assembly to be sealed according to an illustrative embodiment of the present disclosure.

When the cover assembly 100 is in the closed state indicated in FIG. 9, the semicircular concave portions or notches 135 in seal member 126 and the semicircular portions or notches 119 in seal member 116 form run conductor apertures 121. There may be instances where one or more of the run conductor apertures 121 and branch conductor apertures 117 may not be used. In these instances, to provide protection to the contents of cover assembly 100 from the environment, it may be desirable to cover any unused run conductor apertures 121 and/or unused branch conductor apertures 117 to seal the interior of the cover assembly 100. According to an illustrative embodiment of the present disclosure, a run conductor aperture plug 123 includes a first portion 125 shaped and dimensioned to provide a snug and secure fit when inserted in run conductor aperture 121. Second portion 127 of run conductor aperture plug 123 is shaped and dimensioned to be slightly larger in diameter than first portion 125 and abuts seal members 116, 126 when run conductor aperture plug 123 is positioned in the run conductor aperture 121. A branch conductor aperture plug 128 includes a first portion 129 shaped and dimensioned to provide a snug and secure fit when inserted in branch conductor aperture 117. Second portion 131 of branch conductor aperture plug 128 is shaped and dimensioned to be slightly larger in diameter than first portion 129 and abuts seal members 116 when branch conductor aperture plug 128 is positioned in the branch conductor aperture 117. Run conductor aperture plug 123 and branch conductor aperture plug 128 may be formed from any suitable type of material such as, for example, plastics, metals, etc. or combinations thereof.

Exemplary steps for assembling and connecting a run conductor 700 and branch conductors 720 to a connector body 10 and sealing the connected assembly are described by reference to FIGS. 9-18. It is noted these exemplary steps are in no particular order and may be changed where appropriate to make assembly easier for the end user. One or more branch conductors 720 are inserted and passed through branch conductor apertures 117 in first seal member 116*a*. The run conductor 700 is positioned in run conductor notch 119 in first seal member 116*a*. The stripped bare wire conductor ends 720*a* of branch conductors 720 are then positioned in branch conductor apertures or openings 50 in connector body 10. In addition, the run conductor 700 is positioned in run conductor opening 30 in connector body 10. Connector body 10 is then positioned between first die 210 and second die 230 and, using a crimping tool (not shown), is compressed to mechanically and electrically join the run conductor 700 and the one or more branch conductors 720 to the connector body 10 and to each other.

Figure 13:
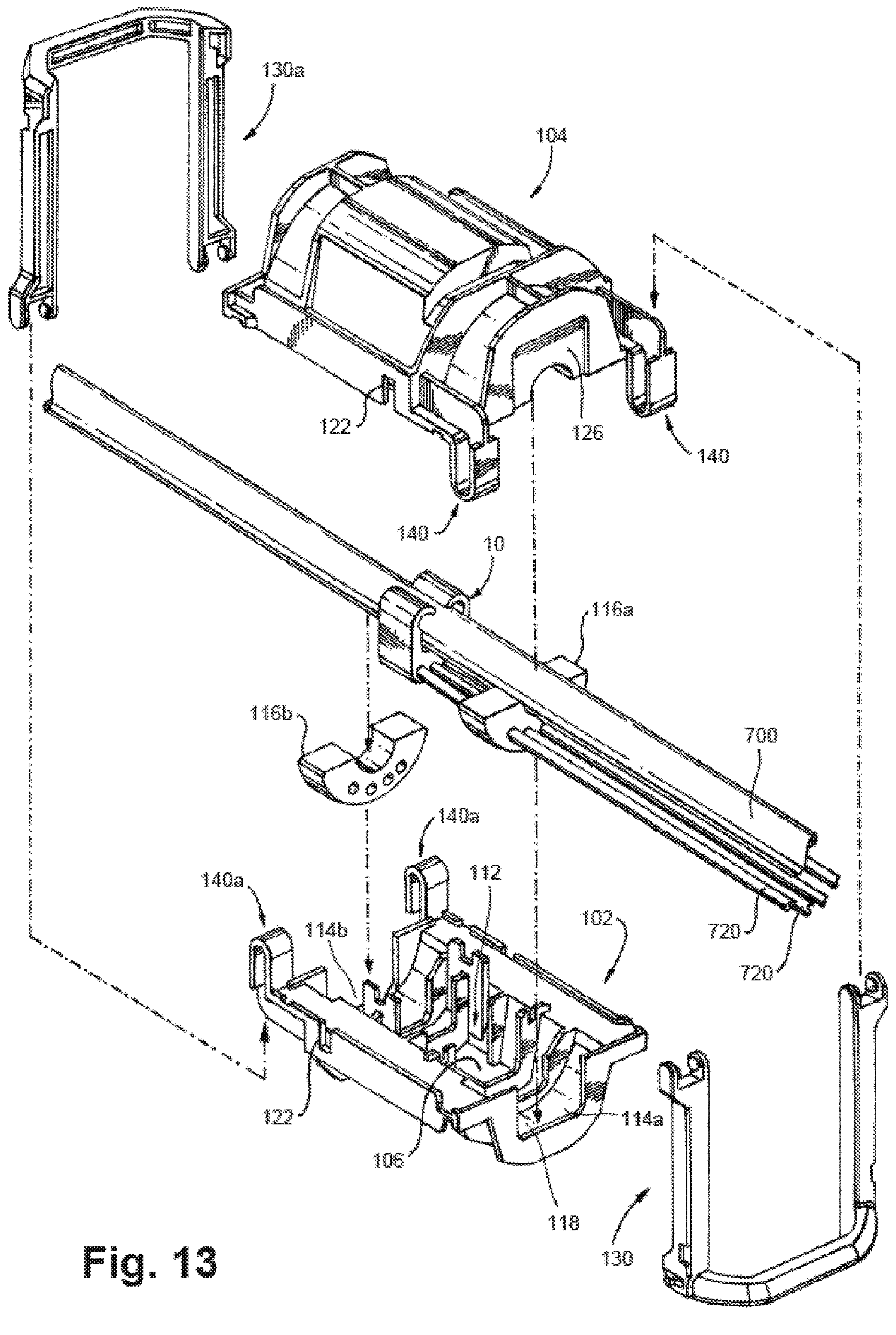
FIG. 13 is an exploded view of the cover assembly of FIG. 1 with a compression connector and run conductor and branch conductors positioned relative to the cover assembly according to an illustrative embodiment of the present disclosure.
Figure 14:
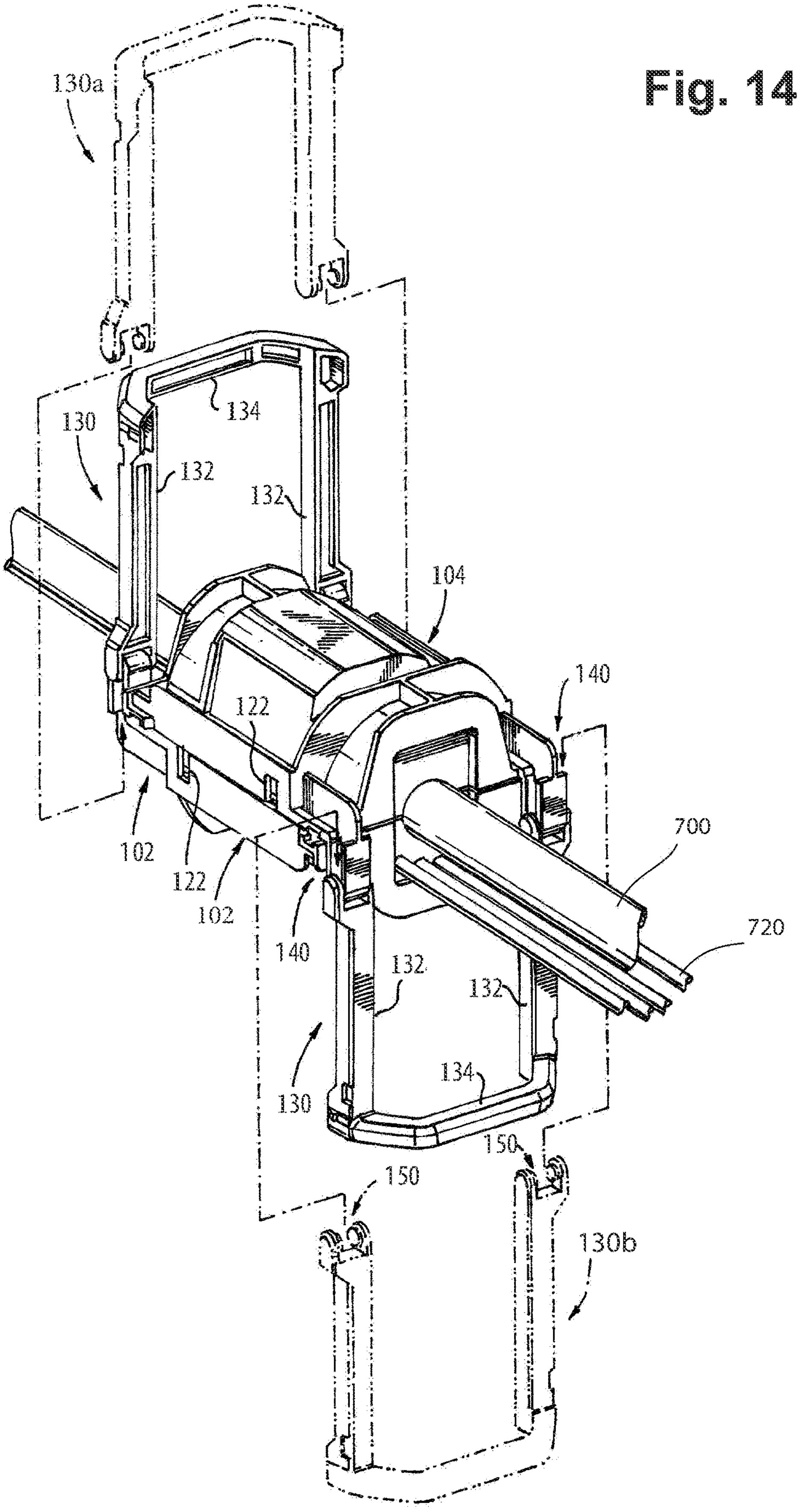
FIG. 14 depicts a step in the process for installing conductors crimped to the compression connector depicted in FIG. 12 into the cover assembly of FIG. 1 according to an illustrative embodiment of the present disclosure.

Referring to FIGS. 13 and 14 the seal member 116*b* is positioned in the seal member cavity 114*b* at the end of the first cover half 102 where the guide rails 140 are located. The crimped connector, conductors and first seal member 116*a* are inserted or placed into the first cover half 102 so that the connector, e.g., connector 10, is in the connector space 112 in the first cover half 102 and the first seal member 116*a* is positioned in the seal member cavity 114*a*. At this point, the run conductor 700 and the branch conductors 720 will be effectively positioned within the conductor channel portion 118 of the first cover half 102. A seal member 126 is positioned within second cover half 104 such that end portions 126*b* rest within seal member cavities 114 and side portions 126*a* rest on ledges 124 of second cover half 104 (see FIGS. 2 and 3). The second cover half 104 is then positioned adjacent the first cover half 102.

Referring to FIG. 14, the latch member 130*a* for the first cover half 102 and the latch member 130*b* for the second cover half 104 are then positioned and mounted to the first and second cover halves 102 and 104, respectively. For example, the latch member 130*b* for the second cover half

104 is then moved over the run conductor 700 and the branch conductors 720, and the carriage-like assemblies 150 of the latch member 130*b* are slid into the guide rails 140 of the second cover half 104 so that the latch member 130*b* is coupled to the second cover half 104. The latch member 130*a* for the first cover half 102 is then moved over the run conductor 700 and the carriage-like assemblies 150 of the latch member 130*a* are slid into the guide rails 140 of the first cover half 102 so that the latch member 130*a* is coupled to the first cover half 102. Referring to FIG. 15, the latch member 130*a* which is attached to the first cover half 102 and the latch member 130*b* which is attached to the second cover half 104 are then pivoted or rotated to their locking positions to secure the first cover half 102 to the second cover half 104. For example, latch member 130*a* is pivoted or rotated in the clockwise direction as shown by arrow "A" and latch member 130*b* is pivoted or rotated in the counter-clockwise direction as shown by arrow "B". Referring to FIG. 16, as the latch member 130*a* is pivoted or rotated in the clockwise direction to the locking position, the one or more snap arms 136 of legs 132 of latch member 130*a* engage the portions of the second cover half 104 adjacent snap recesses 122. As the latch member 130*b* is pivoted or rotated in the counter-clockwise direction to the locking position, the one or more snap arms 136 of legs 132 of latch member 130*b* engage the portions of the first cover half 102 adjacent snap recesses 122. Referring to FIGS. 17 and 18, as the latch members 130*a*, 130*b* are further pivoted or rotated in the clockwise and counter-clockwise directions, respectively, the one or more snap arms 136 snap into the snap recesses 122 in the first cover half 102 and the second cover half 104 to provide a snap-locking feature that locks the first cover half 102 to the second cover half 104 to hold and retain the run conductor, branch conductors and connector safely and securely in the cover assembly 100. In the locked position, the handles 134 of latch members 130*a*, 130*b* are neatly seated out of the way in handle recesses 143 provided in first cover half 102 and second cover half 104.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An enclosure for containing an electrical connector for connecting a plurality of conductors, the enclosure comprising:

a first cover half comprising a first half of a conductor channel portion extending from a first end of the enclosure to a second end of the enclosure;

a second cover half comprising a second half of the conductor channel portion extending from the first end of the enclosure to the second end of the enclosure;

at least one first seal member positionable between the first cover half and the second cover half;

a first latch member pivotably attached to the first cover half;

a second latch member pivotably attached to the second cover half, and wherein when the first cover half is mated with the second cover half with the at least one seal member positioned between the first cover half and the second cover half, the first latch member is pivoted to latch with the second cover half and the second latch member is pivoted to latch with the first cover half such that the first half of the conductor channel portion and the second half of the conductor channel portion form an inner pocket extending from the first end of the enclosure to the second end of the enclosure for receiving the electrical connector and the plurality of conductors.

2. The enclosure as recited in claim 1, wherein at least one of the first and second latch members and the first and second cover halves comprise at least one snap recess.

3. The enclosure as recited in claim 2, wherein at least one of the first and second latch members and the first and second cover halves comprise at least one snap arm member engageable with the at least one snap recess.

4. The enclosure as recited in claim 1, wherein the first cover half and the second cover half are substantially identical.

5. The enclosure as recited in claim 1, further comprising at least one second seal member engageable with the at least one first seal member.

6. The enclosure as recited in claim 5, wherein the first seal member and the second seal member comprise portions for receiving and sealing around a first conductor.

7. The enclosure as recited in claim 6, wherein at least one of the first seal member and the second seal member comprise at least one portion for receiving and sealing around at least one second conductor.

8. The enclosure as recited in claim 7, wherein the first conductor comprises at least one run conductor and the at least one second conductor comprises at least one branch conductor.

9. An enclosure for containing electrical connectors for connecting a plurality of conductors, the enclosure comprising:

a first cover half comprising a first half of a conductor channel portion extending from a first end of the enclosure to a second end of the enclosure;

a second cover half comprising a second half of a conductor channel portion extending from the first end of the enclosure to the second end of the enclosure;

at least one first seal member positionable with respect to at least one of the first cover half and the second cover half;

at least one second seal member positionable with respect to at least one of the first cover half and the second cover half;

a first latch member pivotably attached to the first cover half;

a second latch member pivotably attached to the second cover half; and wherein when the first cover half is mated with the second cover half with the at least one first seal member and the at least one second seal member positioned with respect to the first cover half and the second cover half, the first latch member is pivoted to latch with the second cover half and the second latch member is pivoted to latch with the first cover half such that the first half of the conductor channel portion and the second half of the conductor channel portion form an inner pocket extending from the first end of the enclosure to the second end of the enclosure for receiving the electrical connector and the plurality of conductors.

10. The enclosure as recited in claim 9, wherein at least one of the first and second latch members and the first and second cover halves comprise at least one snap recess.

11. The enclosure as recited in claim 10, wherein at least one of the first and second latch members and the first and second cover halves comprise at least one snap arm member engageable with the at least one snap recess.

12. The enclosure as recited in claim 9, wherein the first cover half and the second cover half are substantially identical.

13. The enclosure as recited in claim 9, wherein the first seal member and the second seal member comprise portions for receiving and sealing around a first conductor.

14. The enclosure as recited in claim 13, wherein at least one of the first seal member and the second seal member comprise at least one portion for receiving and sealing around at least one second conductor.

15. The enclosure as recited in claim 9, wherein at least one of the first seal member and the second seal member comprise at least one through hole.

16. An enclosure for containing electrical connectors for connecting a plurality of conductors, the enclosure comprising:

a first cover half comprising a first cavity extending from a first end of the enclosure to a second end of the enclosure and at least one wall including one or more alignment notches;

a second cover half comprising a second cavity extending from the first end of the enclosure to the second end of the enclosure and at least one wall including one or more alignment notches;

at least one seal member positionable between the first cover half and the second cover half;

a first latch member pivotably attached to the first cover half;

a second latch member pivotably attached to the second cover half; and wherein when the first cover half is mated with the second cover half the first and second cavities form an inner pocket extending from the first end of the enclosure to the second end of the enclosure for receiving an electrical connector.

* * * * *